United States Patent [19]

Lenzkes

[11] Patent Number: 5,037,074
[45] Date of Patent: Aug. 6, 1991

[54] WORK-HOLDING FIXTURE FOR CLAMPING A WORKPIECE IN POSITION ON A WORK-HOLDING TABLE

[76] Inventor: Karl-Heinz Lenzkes, Rosmart 62, 5990 Altena, Fed. Rep. of Germany

[21] Appl. No.: 505,249

[22] Filed: Apr. 3, 1990

[30] Foreign Application Priority Data

Apr. 4, 1989 [DE] Fed. Rep. of Germany ... 8904096[U]
Sep. 11, 1989 [DE] Fed. Rep. of Germany ... 8910814[U]

[51] Int. Cl.$^5$ .............................................. B23Q 3/02
[52] U.S. Cl. ....................................... 269/93; 269/94; 269/238
[58] Field of Search ..................................... 269/91–94, 269/237, 238, 99–100, 81

[56] References Cited

U.S. PATENT DOCUMENTS

| 2,690,088 | 9/1954 | Wiglesworth | 269/94 |
| 4,470,586 | 9/1984 | Spencer | 269/94 |
| 4,496,139 | 1/1985 | Lenz | 269/94 |

FOREIGN PATENT DOCUMENTS

| 3003626 | 8/1981 | Fed. Rep. of Germany | 269/94 |
| 597976 | 9/1975 | Switzerland | 269/94 |

Primary Examiner—Robert C. Watson
Attorney, Agent, or Firm—Thomas, Kerr & Kayden

[57] ABSTRACT

A work-holding fixture for clamping a workpiece in position on a work-holding table has a guide shoe (1) and an associated clamping dog (2) which is designed as rocking lever (21) and has extensions (24) which are arranged in the center area and are supported on the guide shoe. A clamping screw (36) is provided at the free end of the clamping dog (2). The recesses (8, 9) are provided in such a way as to be continuous over the length of the guide shoe (1) and are integral parts of a T-slot-shaped cross-sectional configuration of the guide shoe (1). The clamping dog (2) has a curved form in which the free ends of the gripping leg (22) and of the clamping leg (23) are arranged higher than the extensions (24). The extensions have a roughly elliptical cross-section with an orientation of the large axis roughly in the longitudinal direction of the clamping dog (2). The clamping dog has a return spring (30) acting against the clamping direction. For fixing the guide shoe (1) to the work-holding table, only one fixing screw (11) is provided to which one or more apertures (10) in the front region of the guide shoe (1) are allocated.

13 Claims, 4 Drawing Sheets

WORK-HOLDING FIXTURE FOR CLAMPING A WORKPIECE IN POSITION ON A WORK-HOLDING TABLE

BACKGROUND OF THE INVENTION

The invention relates to a work-holding fixture for clamping a workpiece in position on a work-holding table, comprising a guide shoe, which can be fixed on the work-holding table and has recesses in symmetric arrangement, a clamping dog, which is designed as a rocking lever, has a clamping leg and a gripping leg and, with laterally projecting extensions arranged in the center region, engages into the recesses of the guide shoe and is supported there during clamping, and a clamping screw which passes through the clamping leg in the region of its free end and is supported on the guide shoe during clamping. Such work-holding fixtures are used in particular in the machining of workpieces by the workpiece being clamped in position on the work-holding table.

French Preliminary Published Specification 2,612,439 discloses a work-holding fixture of the type described at the beginning. In this work-holding fixture, a clamping dog is already allocated to a guide shoe. The guide shoe has two oblong-hole-like apertures and is clamped in position by means of two fixing screws in tapped holes which are provided in the work-holding table, the oblong-hole-like apertures enabling an infinitely variable displacement of the guide shoe in a single horizontal direction. The effective direction of the clamping dog in the horizontal direction is thus also established. The clamping dog is of plate-shaped design and, roughly in its center area, has two laterally projecting extensions, the plate-shaped clamping dog thus being designed as a rocking lever and having a clamping leg extending to the rear and a gripping leg extending forward from the extensions, with which gripping leg the workpiece is ultimately clamped in position. The laterally projecting extensions have a cylindrical cross-section and engage on their part into recesses of the guide shoe. These recesses, with the exception of an insertion shaft which can be closed by a headless set-screw or the like, are designed to be enclosed at the margins and enable the clamping dog to be displaced a certain limited distance in the single direction described above relative to the fixed guide shoe before the workpiece is clamped in position. The adjustability in this direction is only comparatively small. The recesses have an effective length which is arranged within the limits of the oblong-hole-like apertures and is smaller than the length of the oblong-hole-like apertures. A clamping screw passes through the free end of the gripping leg, which clamping screw is guided in a corresponding thread in the gripping leg and, when the workpiece is clamped in position, presses down on the rear end of the guide shoe. The clamping range of this known work-holding fixture is restricted vertically to a few bridgeable millimeters, since the clamping dog is of plate-shaped design and is pivotably mounted about the journal-like extensions essentially only to a very limited extent. Furthermore, it is disadvantageous that, due to the fixing of the guide shoe on the work-holding table, only a single direction in the horizontal plane is predetermined in which the work-holding fixture is infinitely adjustable. The displacement travel is here very small and it is necessary to provide a comparatively close grid of tapped holes in the work-holding table so that workpieces protruding to various widths can be clamped at the various locations in this single direction with one and the same work-holding fixture. In this arrangement, it is also disadvantageous that, as a result of the close grid, the guide shoe often has to be shifted on the work-holding table if different sizes of workpieces require this. Clamping in a horizontal direction other than that predetermined by the two fixing screws is not possible. The guide shoe cannot be rotated about a vertical axis. Furthermore, unfavorable force-transmission ratios also result if, for example, the fixing screws are inserted relatively far to the rear at the oblong-hole-like apertures and the extensions and thus the clamping dog come into use in a position displaced relatively far forward in the recesses. Furthermore, it is disadvantageous that the clamping screw, with the free end of its threaded shank, rests in a planar manner on the guide shoe only at a single, fixed workpiece height. At every deviating height of the workpiece, the clamping screw is supported only in a point-like manner on the guide shoe, in the course of which inadmissibly large surface pressures develop. With this known work-holding fixture, it is not possible to clamp workpieces of different height within a larger range, since the tilt angle of the plate-shaped clamping dog is limited to a few degrees.

U.S. Pat. No. 4,470,586 shows a work-holding fixture in which there is no guide shoe. Instead, the clamping dog, which here, too, has two laterally projecting extensions interacts directly with the slot of a slotted work-holding table. For this purpose, the clamping dog has a bent shape, the gripping leg and the clamping leg extending roughly in a straight line relative to one another and the extensions being arranged well below this straight line, since they have to engage into the slot of the work-holding table. A clamping screw is also provided here at the rear end of the clamping dog, that is, at the free end of the clamping leg, which clamping screw is supported on the root of the slot in the slotted table. The laterally projecting extensions provided on the clamping dog have a slightly oval shape, as a result of which the clamping height is limited. The clamping height ends here when the oval extensions abut against two opposite surfaces of the slot of the slotted table; higher workpieces can no longer be clamped with this work-holding fixture. It is thus possible to alternatively clamp workpieces in a height range which exceeds a few centimeters. In the horizontal plane, however, the work-holding fixture is tied to the direction which is predetermined by the direction of the slots in the slotted work-holding table. The work-holding fixture cannot be used in an angular position turned, for example, through 90° thereto or also in any oblique angular position. The free end of the clamping screw here is certainly of spherical design; but here, too, the disadvantage of the point-like force transmission results. A precondition for the applicability of this work-holding fixture is a work-holding table provided with slots. In machining centers, the work-holding tables provided there are often only provided with tapped holes which are arranged in a certain grid. The known clamping dog cannot be used in combination therewith.

SUMMARY OF THE INVENTION

The object of the invention is to provide a work-holding fixture of the type described at the beginning with which it is possible to clamp every point of a workpiece on a work-holding table in a space arising around the work-holding fixture. This is possible in an infinitely variable manner. In the vertical direction, it is possible to clamp a correspondingly large height range of workpieces of different height. In the horizontal plane, it is to be possible for the work-holding fixture to be displaced and used in any desired horizontal direction, and in fact even when the horizontal direction is preferably established by slots of a slotted table or a predetermined grid of tapped holes in the work-holding table.

According to the invention, this is achieved in that the recesses are provided in such a way as to be continuous over the length of the guide shoe and are integral parts of a T-slot-shaped cross-sectional configuration of the guide shoe, in that the clamping dog has a curved form in which the free ends of the gripping leg and of the clamping leg are arranged higher than the extensions, in that the extensions have a roughly elliptical cross-section with an orientation of the large axis roughly in the longitudinal direction of the clamping dog, in that the clamping dog has a return spring acting against the clamping direction and supported on the guide shoe, and in that, for fixing the guide shoe to the work-holding table, only one fixing screw is provided to which one or more apertures, arranged in the front region of the guide shoe are allocated. The relative displaceability between the clamping dog and the guide shoe is greatly increased by the recesses, essentially continuous over the length of the guide shoe, so that clamping can be carried out in the horizontal directions within a larger contour. In other words, the grid dimension of the tapped holes in the work-holding table, for example, can be selected to have a comparatively large spacing; nonetheless, every point can then be clamped. The T-slot-shaped cross-sectional configuration is preferably realized on the guide shoe, while the clamping dog is equipped with the projecting extensions; the opposite arrangement is of course also possible. The vertical clamping range is widened by the curved form of the clamping dog, i.e. workpieces of different height can alternatively be clamped in position within a certain clamping range with one and the same clamping dog. The curved form—in contrast to a plate-shaped form of the clamping dog—also enables a substantially larger swivel angle of the clamping dog about the extensions to be covered. The elliptical design of the extensions is of advantage for the configuration of the acting lever lengths when clamping workpieces of different height. By the elliptical configuration of the extensions, the supporting point of the extensions shifts in the sense that the ratio of the lever lengths of clamping leg to gripping leg changes as little as possible. The absolute lengths certainly change, but the ratio of the lengths remains largely constant or similar so that roughly constant clamping forces can be applied in the case of workpieces of different height. The increase in the clamping range and the accessibility of each point in the space around the work-holding fixture result in universal, multi-purpose applicability, and in fact irrespective of whether the work-holding table is provided with workholding slots or with a grid of tapped holes. Clamping can also be carried out transversely or in any oblique position relative to the slots or tapped holes of a workholding table. The return spring for the clamping dog has a plurality of functions. On the one hand, it ensures that, after the clamping screw is slackened and the workpiece is removed, the clamping dog remains in a position in which the further workpiece to be machined can be pushed under the gripping leg without the latter having to be lifted separately. Furthermore, the return spring ensures that the end of the clamping screw, as it were, is always held in contact with the guide shoe. At the same time, the extensions of the clamping dog also bear in a supporting manner at the top against the T-slot-shaped cross-sectional configuration of the guide shoe. In this respect, the clamping displacements which are to be overcome by turning the clamping screw during slackening and clamping in position decrease. In this respect, the work-holding fixture can be quickly manipulated. However, the return spring has a further advantage: if the work-holding fixture is used on a work-holding table orientated, for example, vertically, the selection of the pretension of the return spring, via the bearing points or surfaces of the end of the clamping screw and of the extensions on the guide shoe, conveniently ensures that the friction is sufficient to secure the relative position between clamping dog and guide shoe. The dead weight of the clamping dog therefore does not lead to the clamping dog being displaced by itself in a vertically orientated guide shoe. This is particularly useful if workpieces of a series, that is, having largely identical dimensions, are machined or clamped. By only a single fixing screw being provided on the guide shoe, this fixing screw forms a vertical axis about which the guide shoe and thus also the clamping dog can be rotated before the fixing screw is tightened. In this respect, the work-holding fixture can be put to use orientated in any horizontal position. Dependence upon the horizontal direction predetermined by the slots of a work-holding table or the zonal arrangement of tapped holes no longer exists. On the one hand, the arrangement of one or more apertures in the front region of the guide shoe provides effective powerful support; on the other hand, the effective area as it were of a work-holding table can be increased by this design, since the work-holding fixture can also be used in such a way that the rear end of the guide shoe projects beyond the margin of the work-holding table. Clamping can also be carried out in such a position.

The clamping screw can have a threaded stud which is guided in a thread in the clamping leg and on whose end facing the guide shoe a supporting ball is arranged which has a flat supporting surface on an extension projecting radially beyond the contour of the ball. This flat supporting surface ensures that, irrespective of the angular position of the clamping dog, the clamping forces which are applied by the clamping screw are no longer supported in a point-like manner but in a planar manner. The advantageous interaction with the return spring also becomes apparent here. The supporting ball, with its supporting surface, is automatically orientated as it were in a planar manner in every angular position, i.e. it is rotated with regard to the threaded stud. The arrangement of the supporting surface on an extension projecting radially beyond the contour of the ball—instead of the use of an oblate ball—ensures that the supporting surface can never shift into the contour of the threaded stud. Furthermore, the supporting surface can be selected to be advantageously larger than the diameter of the ball.

The T-slot-shaped cross-sectional configuration of the recesses can merge into two narrowed portions at the front end of the guide shoe. These two narrowed portions can advantageously be made by the milling cutter, when the T-slot is being milled in the guide shoe, not simply being passed through the guide shoe rectilinearly but by reversing its path of movement before reaching the end point so that narrowed portions defined in a curved shape are left. These narrowed portions then form a stop which prevents the clamping dog from being pulled out to the front. The guide shoe cross-section, which is loaded most of all by the clamping forces when the clamping dog is pushed well forward, is thus strengthened. It would also be possible per se to spot-drill the wall of the guide shoe in this region and insert a clamping pin or a headless set screw which in turn forms a stop which limits the displacement travel of the clamping dog in the guide shoe to the front. A weakening in the relevant cross-section of the guide shoe would, however, be associated with such a design.

Clamping dogs can be provided with a form curved to a different extent, which clamping dogs are allocated to a single guide shoe in order to cover different height ranges. It goes without saying that the curved configuration varies. For low workpieces, the clamping dog is curved to a shallower extent, whereas a swan neck-like configuration is necessary for high workpieces. Thus three differently curved clamping dogs, for example, can be alternatively allocated to one guide shoe, in which case a clamping height range of 6 to 44 mm can be bridged with the first clamping dog, a height range of 40 to 72 mm can be bridged with a middle clamping dog and a height range of 30 to 90 mm can be bridged with a third clamping dog. It goes without saying that the relevant clamping dogs, in the configuration and arrangement of the laterally projecting extensions, are designed to be largely similar or compatible.

A screw or a pin can be provided at the rear end of the T-slot-shaped recesses of the guide shoe, which screw or pin is arranged close above the base of the recesses.

The arrangement and design of the screw or of the pin is matched with the cross-sectional configuration of the T-slot-shaped recess and with the small semiaxis of the elliptical cross-sectional configuration of the projecting extensions of the clamping dog in such a way that the clamping dog, in order to exchange it, can specifically be removed from the guide shoe or placed onto the latter again without slackening the screw or the pin if the return spring is slightly compressed. Compared with the normal displaceability of the clamping dog in the guide shoe, however, the pin or the screw acts as a stop at the rear end of the guide shoe so that the clamping dog cannot fall out of the guide shoe inadvertently.

The return spring can advantageously be provided in the form of a leaf spring and be screwed beneath the clamping leg to the clamping dog, the leaf spring extending forward in a freely projecting manner into the region of the gripping leg. Thus the free end of the leaf spring bears against the base of the T-slot-shaped recess, and the torque exerted by the return spring about the bearing point of the extensions on the guide shoe acts in the correct direction.

The leaf spring can expediently have a T-shaped contour, the largest width being greater than the diameter of the head of the fixing screw so that the displaceability of the clamping dog in the guide shoe is no impaired by the leaf spring. The leaf spring extends with its leg of smaller width through a recessed portion between the projecting extensions so that the free mobility is provided here.

A plurality of apertures which are connected to one another by a slit of reduced width can conveniently be arranged in the front region of the guide shoe. An oblong-hole-like configuration is thus deliberately avoided and merely two or three fixed points are predetermined, where the fixing screws come into action. This is essential for useful support of the clamping forces at the work-holding table. On the other hand, however, this makes it unnecessary for the fixing screws to be completely unscrewed from a T-block if the position of the fixing screw relative to the guide shoe has to be changed. It is not necessary to fit the fixing screw again into a tapped through-hole in the T-block or even to remove the T-block from the slot and completely reinsert laterally the guide shoe plus the T-block. The slit of reduced width which connects the apertures results in stepwise displaceability of the guide shoe and, in combination with the infinitely variable displaceability, existing in each case, of the clamping dog in the guide shoe, in a relatively large range in which the work-holding fixture can be used at a constant vertical axis of the fixing screw.

The extension of the supporting ball of the clamping screw can be provided with a cross-section increasing in diameter in the radial direction so that the supporting surface can be designed to have a correspondingly large area.

A recessed portion through which the return spring extends can be provided between the extensions of the clamping dog so that the return spring is freely movable in this region and is reliably supported with the front end of its T-shaped configuration on the base of the guide shoe. The return spring does not get caught in the region of the laterally projecting extensions of the clamping dog. This also benefits effective and easy displaceability of the clamping dog in the guide shoe.

BRIEF DESCRIPTION OF THE DRAWINGS

The invention is described and explained in greater detail with reference to various embodiments. In the drawing.

DETAILED DESCRIPTION

Figure 1:
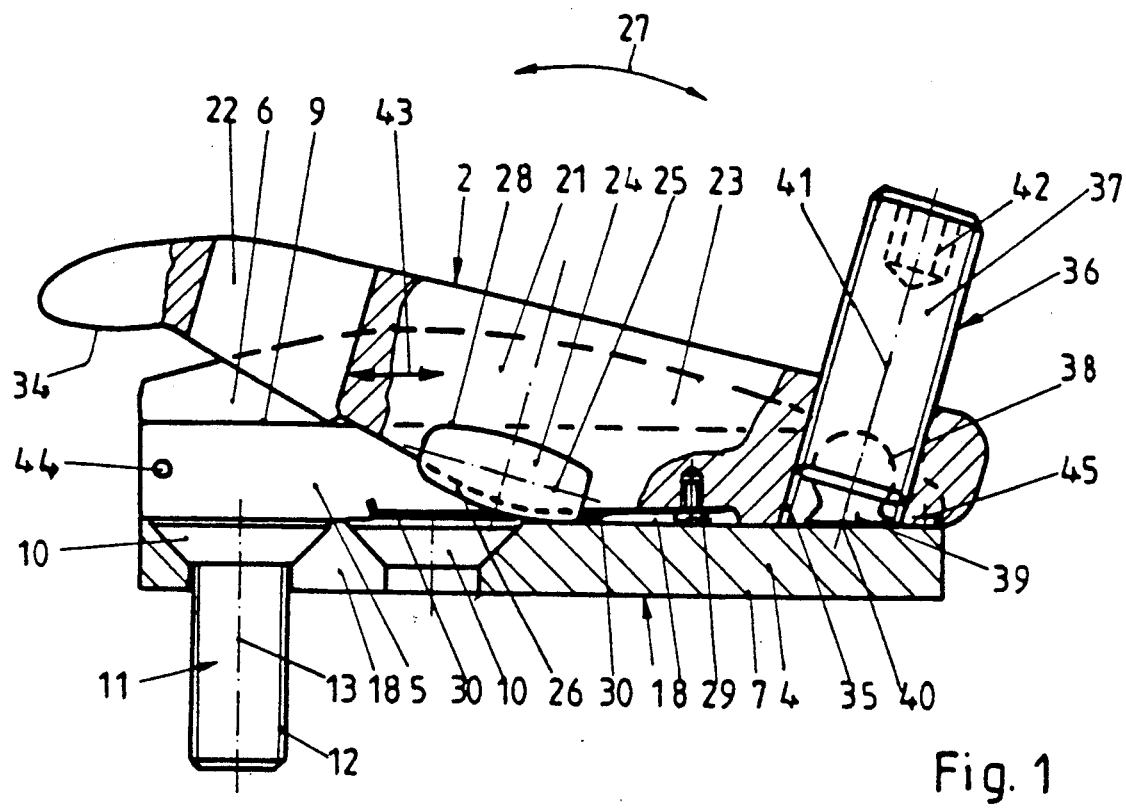
FIG. 1 shows a side view of the work-holding fixture in a first embodiment, partly sectioned.
Figure 2:
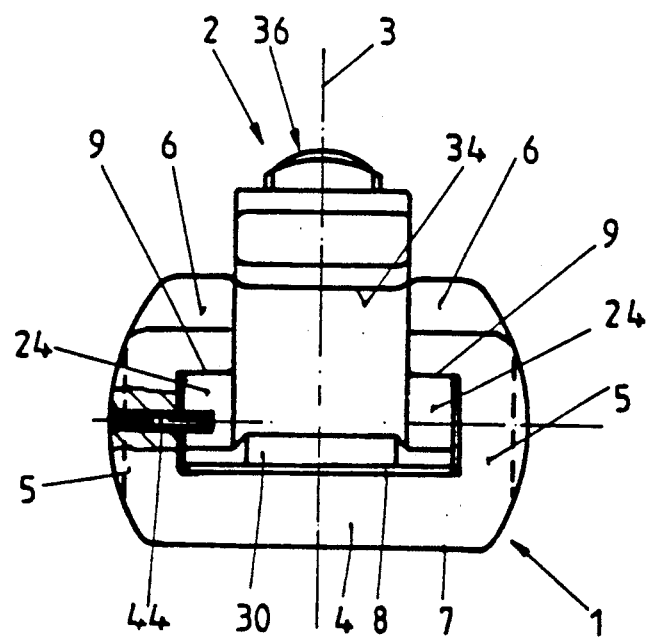
FIG. 2 shows a front view of the work-holding fixture according to FIG. 1.

The work-holding fixture shown in FIG. 1 has as essential integral parts a guide shoe 1 and a clamping dog 2 which are both designed to be essentially symmetric to a longitudinal center plane 3 (FIG. 2). The guide shoe 1 has a configuration roughly in the shape of a T-slot in cross-section (FIG. 2) and, in particular, has a web 4 and two adjoining side walls 5 which end in cheeks 6 protruding inward, so that, in this respect, the T-slot-shaped cross-sectional configuration is enclosed. The web 4 has a bottom face 7 with which the guide shoe 1 and thus the work-holding fixture is mounted on the work-holding table. The web 4 forms a base 8 in the interior of the guide shoe 1. The cheeks 6, at the bottom on the inside, form supporting surfaces 9 on the guide shoe 1. In the front region, the guide shoe 1 has two apertures 10 which have the shape of the head of a fixing screw 11 which is provided with a thread 12. The head of the fixing screw 11 is here designed as a countersunk head, and the apertures 10 are configured in such a way that the fixing screw 11 is put to use in a sunk position in the base 8 of the web 4 of the guide shoe 1. The fixing screw 11 establishes a vertical axis 13 which at the same time represents the screw axis and about which the guide shoe 1 can be rotated in an infinitely variable manner when the fixing screw 11 is not fully tightened. The fixing screw 11 can be screwed into a tapped hole 14 (FIG. 5) which is provided in a work-holding table 15 in a zonally distributed manner at a predetermined grid dimension. But it is also possible to allocate to the fixing screw 11 a T-block 16 (FIGS. 3 and 4) which can be inserted in slots 17 (FIG. 6) of a work-holding table 15. Thus an important advantage of the novel work-holding fixture can already be recognized: the guide shoe 1 and therefore the entire work-holding fixture can be rotated in an infinitely variable manner about the vertical axis 13 on the work-holding table 15 so that any relative orientation between workpiece and work-holding fixture is possible in the horizontal plane above the work-holding table 15. Thus any point in the space can be clamped. The two apertures 10 are connected to one another via an oblong hole 18 (FIG. 1) which is adapted in its diameter to the outside diameter of the shank of the fixing screw 11. This ensures that the fixing screw 11 can only be used at two defined locations for fixing purposes so that the guide shoe 1 can be secured on the work-holding table 15 in these two steps or relative positions. It is of course also possible to arrange, for example, three apertures 10 in this manner. But the apertures 10 are always arranged in the front region, roughly in the front half of the length of the guide shoe, in order to obtain effective powerful support of the work-holding fixture on the work-holding table 15 when a workpiece is clamped in position. As a rule, the workpiece 19 (FIG. 5), with its surfaces 20 to be clamped, is located in front of the guide shoe 1 so that the clamping dog 2 has to be displaced more or less to the front or the rear in the guide shoe 1 in order to reach the desired clamping position.

Figure 9:
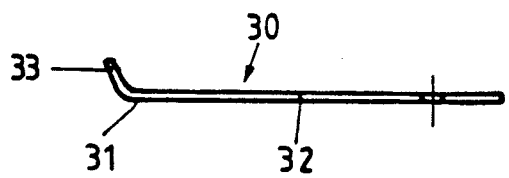
FIG. 9 shows a side view of the return spring of the work-holding fixture.
Figure 10:
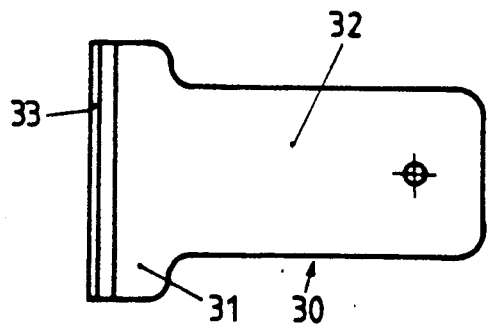
FIG. 10 shows a plan view of the return spring according to FIG. 9.

The clamping dog 2 is designed like a rocking lever 21 which merges in one piece to the front [lacuna] a gripping leg 22 and to the rear into a clamping leg 23. Roughly in the center area, the rocking lever 21 or the clamping dog 2 has laterally projecting extensions 24 symmetric to the longitudinal center plane 3 which have a roughly oval or elliptical elongated shape (FIG. 1), the large axis 25 being arranged roughly parallel to the longitudinal extent of the rocking lever 21. The extensions 24 are arranged, as it were at the lower margin of the rocking lever 21 and project slightly further downward, a recessed portion 26 being formed between the extensions. Depending on the swivel angle 27 (FIG. 5), the extensions 24, along two bearing points or bearing lines 28, bear against supporting surfaces 9 of the cheeks 6 of the guide shoe 1 and are supported there. As a rule, the extensions 24 are not supported on the base 8 of the guide shoe 1. For this purpose, a return spring 30, by means of a screw 29, is fixed to the underside of the clamping dog 2 in such a way that the free end 31 of the return spring 30 projects to the front and is supported against the base 8 of the guide shoe 1, in which arrangement the return spring 30 can be designed as a leaf spring (FIGS. 9 and 10) and is widened in the front region, adjoining which to the rear is a web 32 which is designed to be of smaller width and extends in a freely movable manner through the recessed portion 26 between the extensions 24. At its front end 31, the return spring 30 can merge into a bent-up portion 33 so that the return spring 30 does not impair the free displacement of the clamping dog 2 in the guide shoe 1. The free end 31 of the return spring 30 is also designed to be wider than the largest diameter of the apertures 10 in the web 4 of the guide shoe 1 so that the return spring 30 cannot catch in apertures 10 during displacement of the clamping dog 2. The return spring 30 is arranged in such a way that a torque is exerted from here in the clockwise direction (FIG. 1) over the swivel angle 27 so that the clamping leg 23 is loaded in such a way as to face the base 8 of the guide shoe 1.

The front end of the clamping dog 2 or of the gripping leg 22 merges into a gripping jaw 34, conveniently of spherical design, which comes into contact with the surface 20 of the workpiece 19 and via which the clamping force is transmitted to the workpiece 19. In the rear region of the clamping dog 2, the clamping leg 23 has an aperture provided with a thread 35, through which aperture a clamping screw 36 passes which, in particular, consists of a threaded stud 37 and a supporting ball 38 fixed to its lower end. In the radial direction, the supporting ball 38 has an extension 39 which merges into a flat supporting surface 40 which is supported or rests in a planar manner on the base 8 of the guide shoe 1. The axis 41 of the clamping screw 36 also shifts in accordance with the changing swivel angle, the supporting ball 38 rotating in its receptacle at the front end of the threaded stud 37 in such a way that the supporting surface 40 is always guided in parallel with and in contact with the base 8 of the guide shoe 1. The supporting surface 40 can have a larger outside diameter than the outside diameter of the supporting ball 38 so that the clamping force exerted here can be transmitted via a comparatively large area with low surface pressure. The threaded stud 37 of the clamping screw 36 has a cavity 42 or another corresponding shape for the attachment of a turning tool, here a key for a hexagon socket screw.

As apparent, the clamping dog 2, in the released position, can be displaced in the guide shoe 1 according to arrow 43 in the longitudinal direction, which is established by the longitudinal center plane 3, so that the front end of the clamping dog 2, with the gripping jaw 34, projects more or less far beyond the front end of the guide shoe 1 and thus can be lowered onto a surface 20, to be clamped, with a workpiece 19 by the clamping screw 36 being tightened. The workpiece 19 is loosened or released in the opposite direction of rotation of the clamping screw 36. The free displaceability of the clamping dog 2 in the guide shoe 1 can be limited by stops. For this purpose, a clamping pin 44, in the embodiment in FIGS. 1 and 2, is knocked into a corresponding bore in one side wall 5 of the guide shoe 1 in such a way that it projects to the inside so that the corresponding extension 24 comes to bear here when the clamping dog 2 is pushed forward. Such a stop can also be provided at the rear end of the guide shoe. Here, however, a headless setscrew or a stud 45 (FIG. 6) is conveniently provided close above the base 8 of the guide shoe 1 so that here, too, the normal displaceability of the clamping dog 2 in the guide shoe is limited to the rear. The clamping dog 2 cannot fall out of the guide shoe either to the front or to the rear. As a result of the higher arrangement of the clamping pin 44, removal to the front is not possible (nor is it necessary as a rule). The arrangement of the stud 45 and its configuration in conformity with the small axis of the extensions 24 or the height of the distance between the supporting surface 9 and the base 8 is dimensioned in such a way that the clamping dog 2, with the return spring 40 being compressed and when an appropriate swivel angle 27 is assumed, can be taken out through the intermediate space between stud 45 and supporting surface 9, for example in order to insert into the identical guide shoe 1 a clamping dog (FIGS. 3 and 4) bent in a different shape or to exchange such clamping dogs so that different height ranges of workpieces 19 can be covered.

Figure 3:
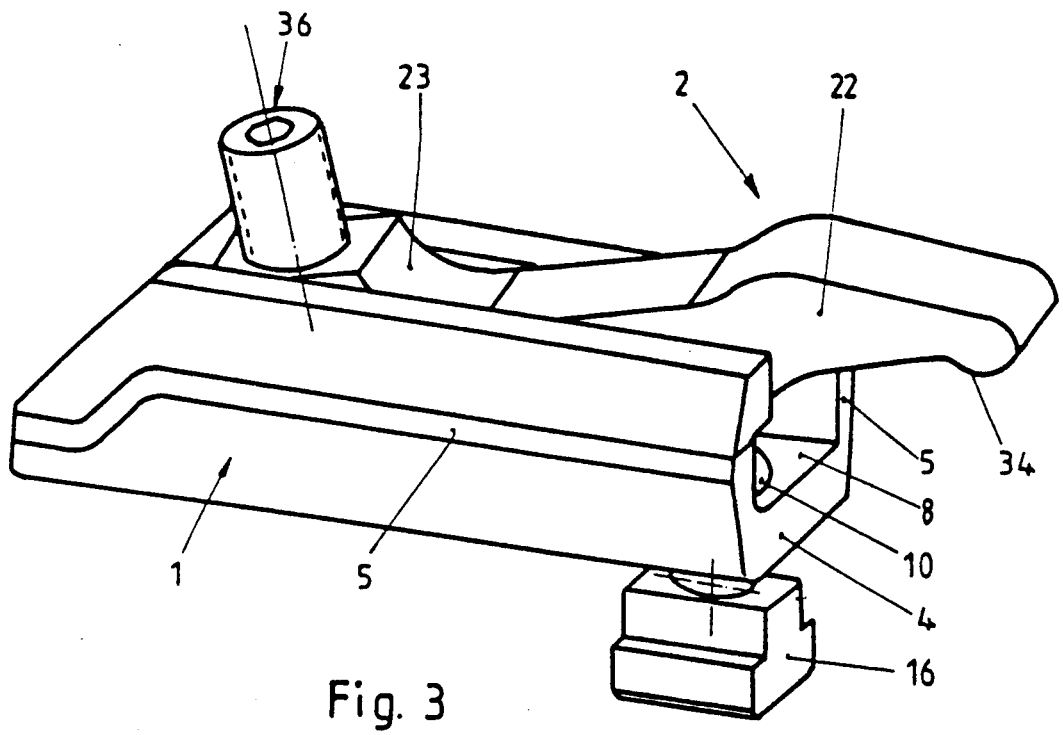
FIG. 3 shows a perspective representation of the work-holding fixture in a second embodiment.
Figure 4:
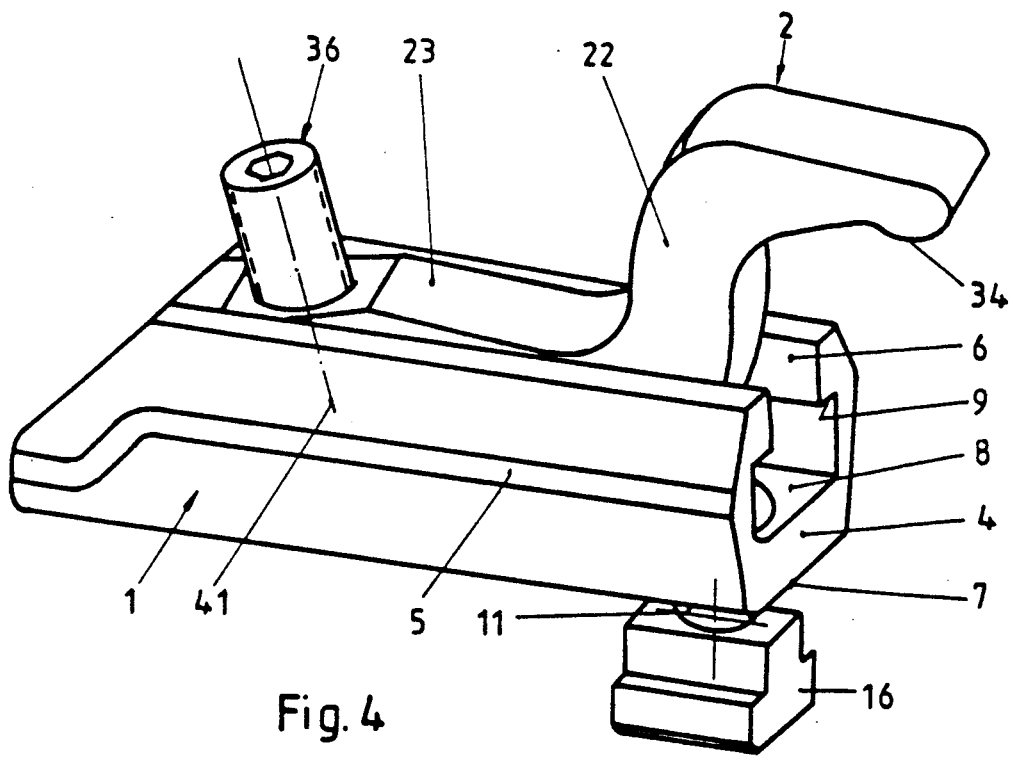
FIG. 4 shows a perspective representation of the work-holding fixture according to FIG. 3 with a clamping dog of different design.

The representations of the exemplary embodiments according to FIGS. 3 and 4 show a work-holding fixture having an identical guide shoe 1 and inserted clamping dogs 2 bent differently. The clamping dog 2 according to FIG. 3 is provided and designed for clamping workpieces 19 in a height range between 3 and 40 mm, whereas the embodiment according to FIG. 4 can be designed for a height range of 20 to 50 mm. The two FIGS. 3 and 4 at the same time illustrate that a plurality of clamping dogs 2 can be allocated to one guide shoe 1 so that interchangeability is provided if workpieces of greatly differing heights are to be clamped in succession. FIGS. 3 and 4 as well as FIG. 1 clearly reveal that the respective clamping dogs 2 have a bent, curved shape. The end regions of the gripping leg 22 and of the clamping leg 23 can be connected to one another by an imaginary line. The shape is then always such that the laterally projecting extensions 24 lie below this line. In this way, the swivel angle 27 is increased and the clamping range of the respective clamping dogs is extended.

Figure 5:
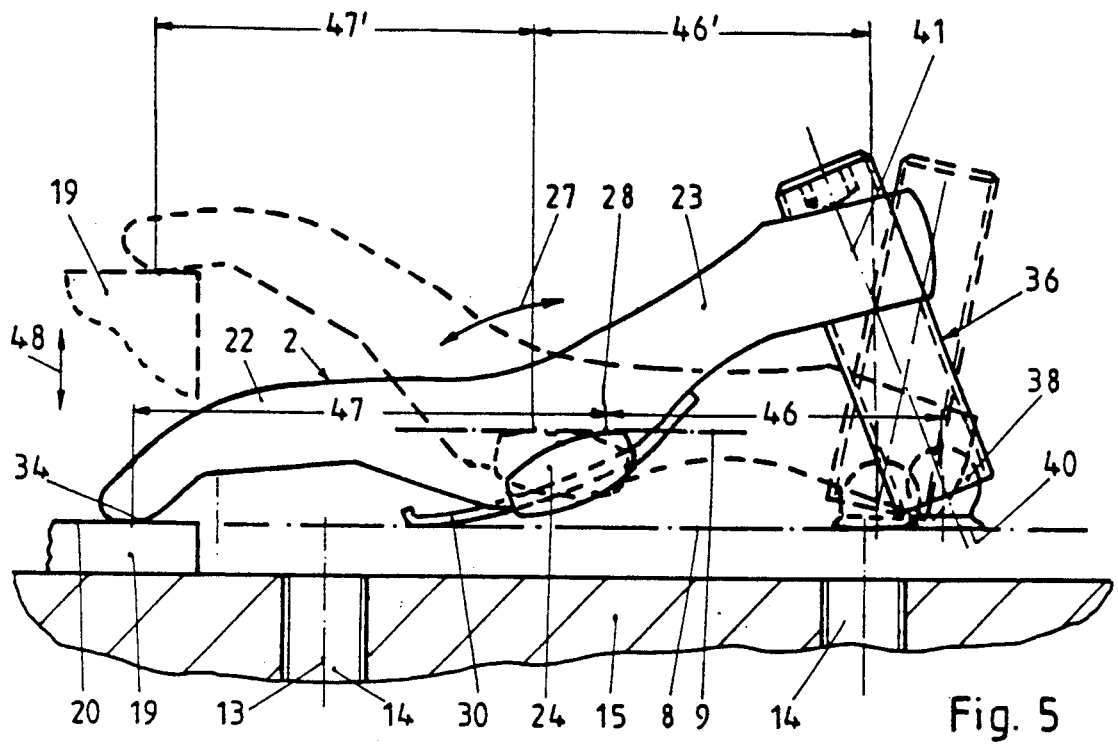
FIG. 5 shows a sectional representation of essential parts of the work-holding fixture according to FIG. 3 in various clamping states.
Figure 6:
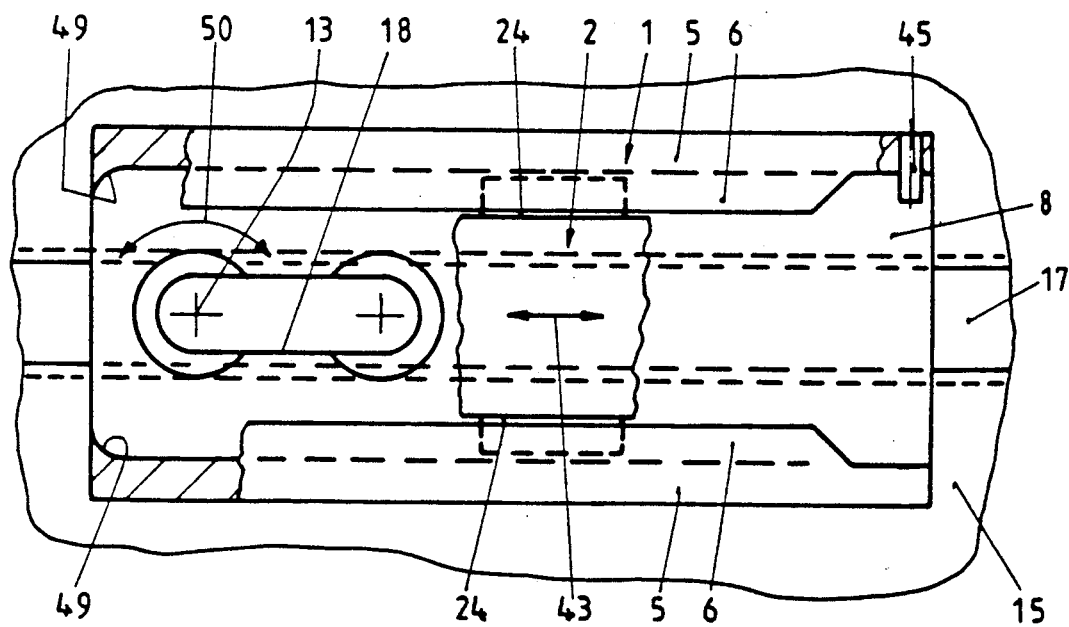
FIG. 6 shows a plan view of the work-holding fixture according to FIG. 3, partly sectioned.

The aim of the special configuration of the extensions 24 is to be illustrated with reference to FIG. 5. Indicated here is first of all a work-holding table 15 on which a workpiece 19 of relatively low height is to be clamped. The relative position of the clamping dog 2 is illustrated by solid lines, edges of the guide shoe 1 being indicated by dashed lines. It will be recognized that the clamping dog 2 is swiveled in accordance with swivel angle 27 in such a way that the gripping jaw 34 has come down on the surface 20 of the workpiece and is thus located at a lower level than the rear end of the clamping leg 23. FIG. 5 may represent the clamp position, that is, after the clamping screw 36 is tightened. It can be recognized that the bearing line 28, which is in contact with the supporting surface 9 of the guide shoe 1, is located relatively far to the rear on the extensions 24 of the clamping lever 2. Since the clamping force is transmitted to the workpiece in the perpendicular direction and the support in the region of the supporting surface 40 is also effected perpendicularly, the projection in the perpendicular direction of the distances must be taken into account for the lever arms. Here, an effective clamping-leg length 46' and an effective gripping-leg length 47' result. Since the axis 41 of the clamping screw 36 extends obliquely to the rear, the clamping-leg length 46 is certainly comparatively increased by this clamping position. But at the same time the bearing line 28 also shifts to the rear so that the increase in the distance is split up between the clamping-leg length 46' and the gripping-leg length 47' so that the ratio of the two leg lengths is kept approximately constant irrespective of the particular swivel angle 27. The shape of the extension 24 can have an effect on the shifting of the bearing line 28. This clamping position shown by solid lines is to be compared with the clamping position shown by broken lines for a substantially higher workpiece 19. In this gripping position, the clamping dog 2 is swiveled in the clockwise swiveling direction in accordance with the swivel angle 27, the supporting surface 40, in the vertical projection, moving nearer to the gripping jaw 34. This results in a changed clamping-leg length 46' and a changed gripping-leg length 47'. It will be recognized that the bearing line 28 at the extensions 24 has shifted comparatively forward. The ratio of leg lengths 46 to 47 corresponds approximately to that of 46' to 47'. This correspondingly applies to all intermediate positions over the swivel angle 27. This shows that, irrespective of the height range which can be clamped in accordance with double arrow 48, when the clamping screw 36 is comparably tightened, comparable clamping forces are also transmitted by the clamping jaw 34.

FIG. 6 again illustrates the relationships in the form of a plan view of a work-holding table 15 which is provided with slots 17 so that a T-block 16 according to FIGS. 3 and 4 is used, although this T-block 16 is not shown. Essentially shown is the guide shoe 1, which is shown in partial section in the front region. Also recognizable here are narrowed portions 49 which act as a stop for the extensions 24 and replace the clamping pin 44 (FIG. 1). These narrowed portions 49, which are defined by a round design, are obtained when the T-slot is milled on the guide shoe by the feed of the milling cutter from the rear to the front being stopped and by the feed direction then being reversed again. At the same time, it can be recognized that the cross-section of the side walls 5 of the guide shoe 1, which are subjected to particular stress, are not weakened here in this region but on the contrary are strengthened.

The fixing screw, which is not shown here, may be inserted in accordance with the vertical axis 13. The guide shoe 1 is here shown in parallel orientation to the slot 17. However, it can be recognized that, by the use of only a single fixing screw, the guide shoe 1 can be rotated in an infinitely variable manner about the vertical axis 13 relative to the position of the slot 17 on the work-holding table 12 and can be screwed tight in any position. This is illustrated by the double arrow 50. It can thus be recognized at the same time that, in the group of planes above the bearing surface of the work-holding table 15, any point in the space can be reached and thus clamped. The radial direction or distance is then produced by displacing the clamping dog 2 in accordance with arrow 43. The height ranges which can be clamped in accordance with double arrow 48 (FIG. 5) result from the special design of every individual clamping dog 2 used and inserted. It is thus easily comprehensible that, in a space above the surface of the work-holding table 15, every point as it were can be clamped. Thus any relative position between work-holding fixture and workpiece 19 can be utilized. This space is certainly not unlimited, but depends on the other geometric dimensions of the guide shoe 1 and the clamping dog 2.

The cheeks 6 end at some distance in the rear region of the guide shoe 1, and a sloping end face extends down to the base 8 of the guide shoe 1. The stud 45 is also arranged in this region so that it is conceivable that the stud 45 will certainly normally form a stop against the displacement of the clamping dog 2 in the guide shoe 1 to the rear, but on the other hand in a specific manner the extensions 24 and thus the clamping dog 2 can be taken out of the opening, thus formed, at the rear on the guide shoe in the region of the stud 45.

Figure 7:
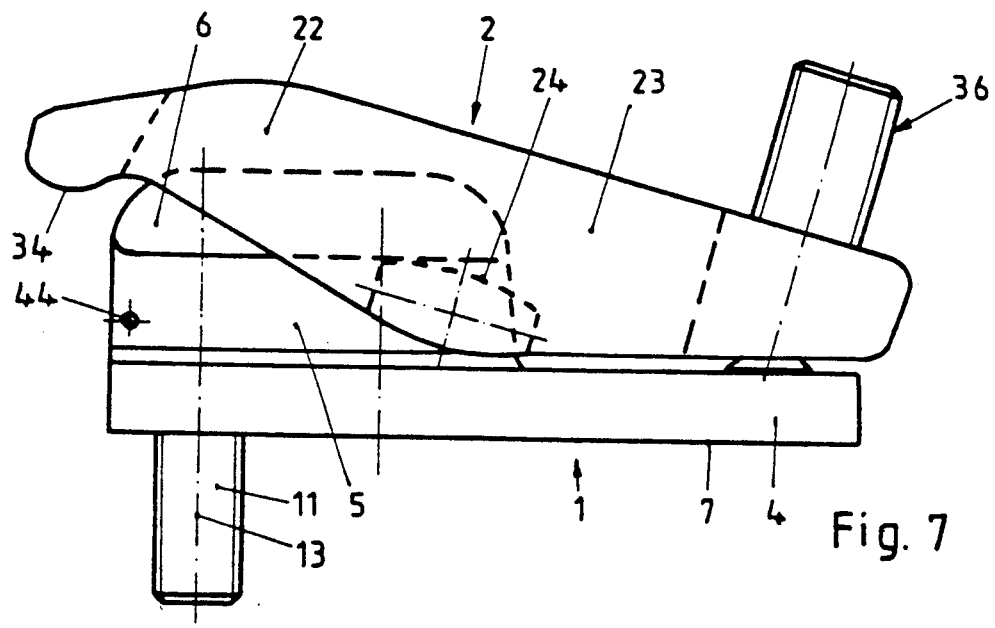
FIG. 7 shows a side view of a third embodiment of the work-holding fixture.
Figure 8:
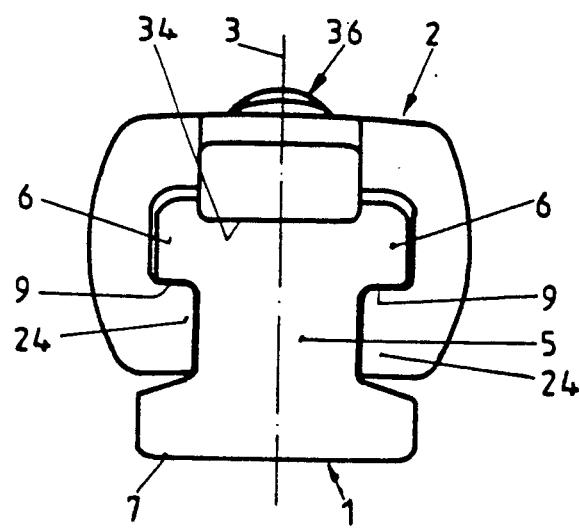
FIG. 8 shows a front view of the work-holding fixture according to FIG. 7.

FIGS. 7 and 8 show a further exemplary embodiment of the work-holding fixture which represents as it were the reversal of the exemplary embodiments shown hitherto insofar as the two side walls 5 are here combined in a center wall 5 on the guide shoe 1, from which center wall 5 cheeks 6 are provided in such a way as to project symmetrically to the longitudinal center plane 3. Accordingly, the clamping dog 2 has a recess designed centrally and symmetrically and, with extensions 24 extending to the inside, reaches across the guide shoe 1 (FIG. 8). The rest of the work-holding fixture is designed accordingly. Corresponding relationships result. There is also a return spring here, but it is not shown for the sake of clarity.

FIGS. 9 and 10 again illustrate the design and shape of the return spring 30 with its web 32 and the widened free end 31. Also indicated is an aperture through which the screw 29 passes when tightly screwing the return spring 30 to the clamping dog 2. It goes without saying that the return spring 30 is mounted on the clamping dog 2 in such a way that the bent-up portion 33 comes to lie at the top, that is, facing away from the base 8.

While the preceding description sets forth illustrative embodiments of the invention, it will be understood by those skilled in the art that the description is intended to be illustrative other than restrictive and variations and modifications can be made to the disclosed embodiments without departing from the spirit and scope of the invention as set forth in the following claims.

LIST OF REFERENCE NUMERALS

| | |
|---|---|
| 1 = | guide shoe |
| 2 = | clamping dog |
| 3 = | longitudinal center plane |
| 4 = | web |
| 5 = | side wall |
| 6 = | cheek |
| 7 = | face |
| 8 = | base |
| 9 = | supporting surface |
| 10 = | aperture |
| 11 = | fixing screw |
| 12 = | thread |
| 13 = | vertical axis |
| 14 = | tapped hole |
| 15 = | work-holding table |
| 16 = | T-block |
| 17 = | slot |
| 18 = | oblong hole |
| 19 = | workpiece |
| 20 = | surface |
| 21 = | rocking lever |
| 22 = | gripping leg |
| 23 = | clamping leg |
| 24 = | extension |
| 25 = | axis |
| 26 = | recessed portion |
| 27 = | swivel angle |
| 28 = | bearing line |

-continued

| | |
|---|---|
| 29 = | screw |
| 30 = | return spring |
| 31 = | end |
| 32 = | web |
| 33 = | bent-up portion |
| 34 = | gripping jaw |
| 35 = | thread |
| 36 = | clamping screw |
| 37 = | threaded stud |
| 38 = | supporting ball |
| 39 = | extension |
| 40 = | supporting surface |
| 41 = | axis |
| 42 = | cavity |
| 43 = | arrow |
| 44 = | clamping pin |
| 45 = | stud |
| 46 = | clamping-leg length |
| 47 = | gripping-leg length |
| 48 = | double arrow |
| 49 = | narrowed portion |
| 50 = | double arrow |

I claim:

1. A work-holding fixture for clamping a workpiece in position on a work-holding table, said fixture comprising:
   an elongated guide shoe adapted to be movably fixed about a vertical axis on the work-holding table,
   said guide shoe defining an elongated slot T-shaped in cross section including a central slot with laterally extending internal cavities extending in opposite directions from said central slot and each internal cavity defining a downwardly facing support surface,
   a longitudinally extending rocking level clamping dog having at one end a clamping leg and at the other end a gripping leg and a center region positioned in said central slot of said guide shoe and including lateral extensions projecting in opposed directions into the lateral cavities of said T-shaped slot to engage said support surfaces during clamping of a work piece,
   means mounted to said clamping leg adapted to bear against said guide shoe during clamping of a work piece for urging said gripping leg into engagement with a work piece,
   said lateral cavities extending along at least a portion of the length of said guide shoe for allowing said lateral projections to move along the length of said T-shaped slot,
   said clamping dog having a curved configuration wherein the free end of said gripping leg and the free end of said clamping leg extend higher above said guide shoe than said extensions,
   said extensions having a substantially elliptical cross-section with the large axis extending approximately in the longitudinal direction of the clamping dog, and
   a return spring mounted on said clamping dog adapted to bear against said guide shoe for holding said gripping leg elevated with respect to said guide shoe.

2. A work-holding fixture according to claim 11, wherein said clamping screw has a threaded stud received in a threaded bore in the clamping leg on the end of which adjacent the guide shoe is mounted a supporting ball having a flat supporting surface on an extension projecting radially beyond said ball.

3. The work-holding fixture according to claim 1, wherein said T-shaped slot of said guide shoe merges into two narrowed portions at one end of said guide shoe and a removable pin member intersecting the other end of said T-shaped slot for retaining the clamping dog in said guide shoe.

4. The work-holding fixture according to claim 1, said guide shoe having stop members at opposite ends of said T-shaped slot for retaining said clamping dog in said T-shaped slot.

5. The work-holding fixture according to claim 1 wherein said return spring is in the form of a leaf spring and is mounted beneath said clamping leg to said clamping dog and extends toward the free end of said gripping leg in a freely projecting manner into the region of said gripping leg.

6. The work-holding fixture according to claim 5, wherein said leaf spring has a T-shaped contour.

7. The work-holding fixture according to claim 1, wherein said guide shoe has a plurality of apertures connected to one another by an oblong hole of a width to permit passage of said fixing screw in one end region of the guide shoe.

8. The work-holding fixture according to claim 2, wherein said extension of the supporting ball of said clamping screw has a cross-section which increases in diameter in the radial direction.

9. The work-holding fixture according to claim 1, wherein said clamping dog has a recessed portion through which said return spring extends, said recessed portion being located between said extensions of said clamping dog.

10. The work holding fixture of claim 1 and wherein said guide shoe defines an aperture at said vertical axis, and a fixing screw extending through said aperture for mounting the guide shoe to a work holding table.

11. A work-holding fixture for clamping a workpiece in position on a work-holding table, said fixture comprising:
an elongated guide shoe,
means for anchoring the guide shoe at one end thereof to a work table about a vertical axis,
said guide shoe having symmetrical recesses in the exterior sides thereof and extending longitudinally, said recesses forming support surfaces on said guide shoe,
a longitudinally extending clamping dog including a clamping leg having a free end and a gripping leg having a free end and a center region,
laterally projecting extensions on said clamping dog in said center region, said extensions being adapted to extend within said recesses and to engage said support surfaces during clamping of a work piece,
a threaded bore adjacent said free end of said clamping leg and extending therethrough,
a clamping screw in said threaded bore adapted to have one end bear against said guide shoe during clamping of a work piece, and
a return spring mounted on said clamping dog adapted to bear against said guide shoe for holding said gripping leg elevated with respect to said guide shoe.

12. A work holding fixture as claimed in claim 10 wherein the free end of said gripping leg extends higher above said guide shoe than said extensions.

13. A work-holding fixture as claimed in claim 10 wherein each of said extensions has an elliptical cross-section with the major axis thereof extending approximately in the longitudinal direction of said clamping dog, said extensions being longitudinally movable within said recesses.

* * * * *